United States Patent
Yu et al.

(10) Patent No.: US 9,807,036 B2
(45) Date of Patent: Oct. 31, 2017

(54) APPARATUS AND METHOD FOR ENCODING MDIO INTO SGMII TRANSMISSIONS

(71) Applicant: QUALCOMM INCORPORATED, San Diego, CA (US)

(72) Inventors: Hongchun Yu, Shanghai (CN); Honglu Chen, Shanghai (CN); Chi Huang, Shanghai (CN); Wenjun Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 14/654,152

(22) PCT Filed: Dec. 20, 2012

(86) PCT No.: PCT/CN2012/087029
§ 371 (c)(1),
(2) Date: Jun. 19, 2015

(87) PCT Pub. No.: WO2014/094278
PCT Pub. Date: Jun. 26, 2014

(65) Prior Publication Data
US 2015/0326504 A1    Nov. 12, 2015

(51) Int. Cl.
*H04L 12/28*    (2006.01)
*H04L 27/00*    (2006.01)
(Continued)

(52) U.S. Cl.
CPC ........ *H04L 49/30* (2013.01); *H04L 12/40013* (2013.01); *H04L 12/413* (2013.01)

(58) Field of Classification Search
CPC .. H04L 49/30; H04L 12/40013; H04L 12/413
See application file for complete search history.

(56) References Cited

U.S. PATENT DOCUMENTS 7,343,425 B1    3/2008  Lo
7,751,442 B2    7/2010  Chang
(Continued)

FOREIGN PATENT DOCUMENTS

CN    1522522 A       8/2004
CN    101304296 A    11/2008
(Continued)

OTHER PUBLICATIONS

IEEE 802.3ae Part 3: Carrier Sense Multiple Access with Collision Detection (CSMA/CD) Access Method and Physical Layer Specifications, Amendment: Parameters, Physical Layers, and Management Parameters for 10 Gb/s Operation, 2002 (Aug. 30, 2002), the whole document, 529 pp.
(Continued)

*Primary Examiner* — Kiet Tang
(74) *Attorney, Agent, or Firm* — Paradice and Li LLP

(57) ABSTRACT

A method of communication between an Ethernet Media Access Controller (MAC) and a physical interface (PHY) is disclosed. The method includes establishing communication between the MAC and the PHY via a first serial link in accordance with a Serializer Deserializer (SERDES) protocol. In a data transfer mode, data is transferred along the first serial link. Idle frames are transferred within an idle time gap along the link in an idle mode. The PHY is managed by encoding Management Data Input/Output (MDIO) information in one or more MDIO frames, and transferring the one or more MDIO frames within the idle time gap along the first serial link.

6 Claims, 4 Drawing Sheets

(51) Int. Cl.
*G06F 1/00* (2006.01)
*G06F 3/00* (2006.01)
*H04L 12/935* (2013.01)
*H04L 12/413* (2006.01)
*H04L 12/40* (2006.01)

(56) References Cited

U.S. PATENT DOCUMENTS

| | | | |
|---|---|---|---|
| 2009/0046804 A1* | 2/2009 | Yuan | H04L 49/351 375/295 |
| 2009/0125735 A1* | 5/2009 | Zimmerman | G06F 1/3203 713/310 |
| 2010/0111081 A1 | 5/2010 | Diab | |
| 2014/0164647 A1* | 6/2014 | Lee | G06F 13/385 710/4 |

FOREIGN PATENT DOCUMENTS

| | | |
|---|---|---|
| CN | 101473617 A | 7/2009 |
| EP | 1988470 A2 | 11/2008 |
| JP | 2011199761 A | 10/2011 |

OTHER PUBLICATIONS

International Search Report and Written Opinion—PCT/CN2012/087029—ISA/EPO—Sep. 26, 2013.
Serial-GMII Specification, Yi-Chin Chu, Cisco Systems, ENG-46158 Revision 1.7, Jul. 19, 2001 (Jul. 19, 2001), the whole document.
Supplementary European Search Report—EP12890619—Search Authority—Munich—Jun. 27, 2016.

\* cited by examiner

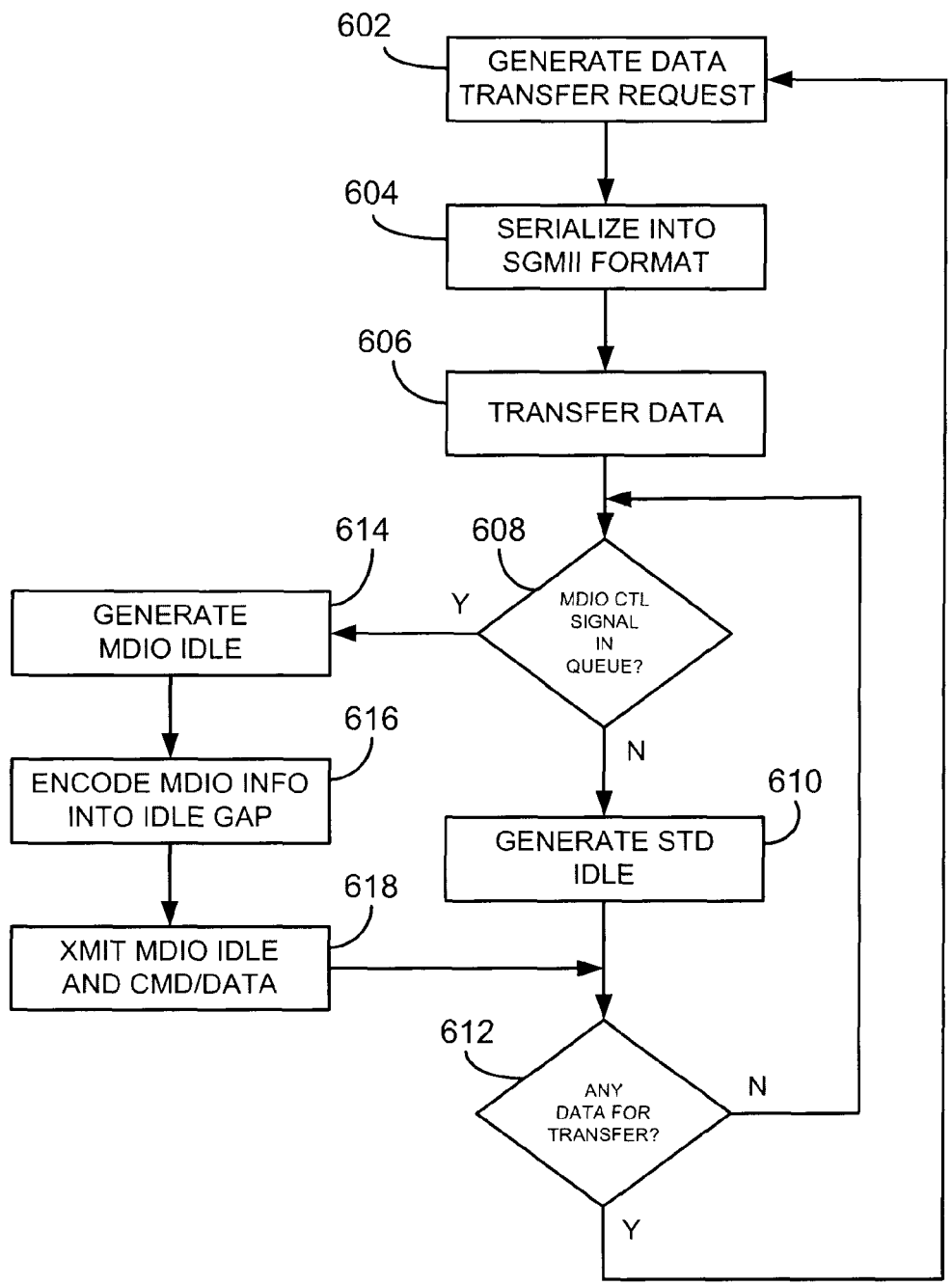

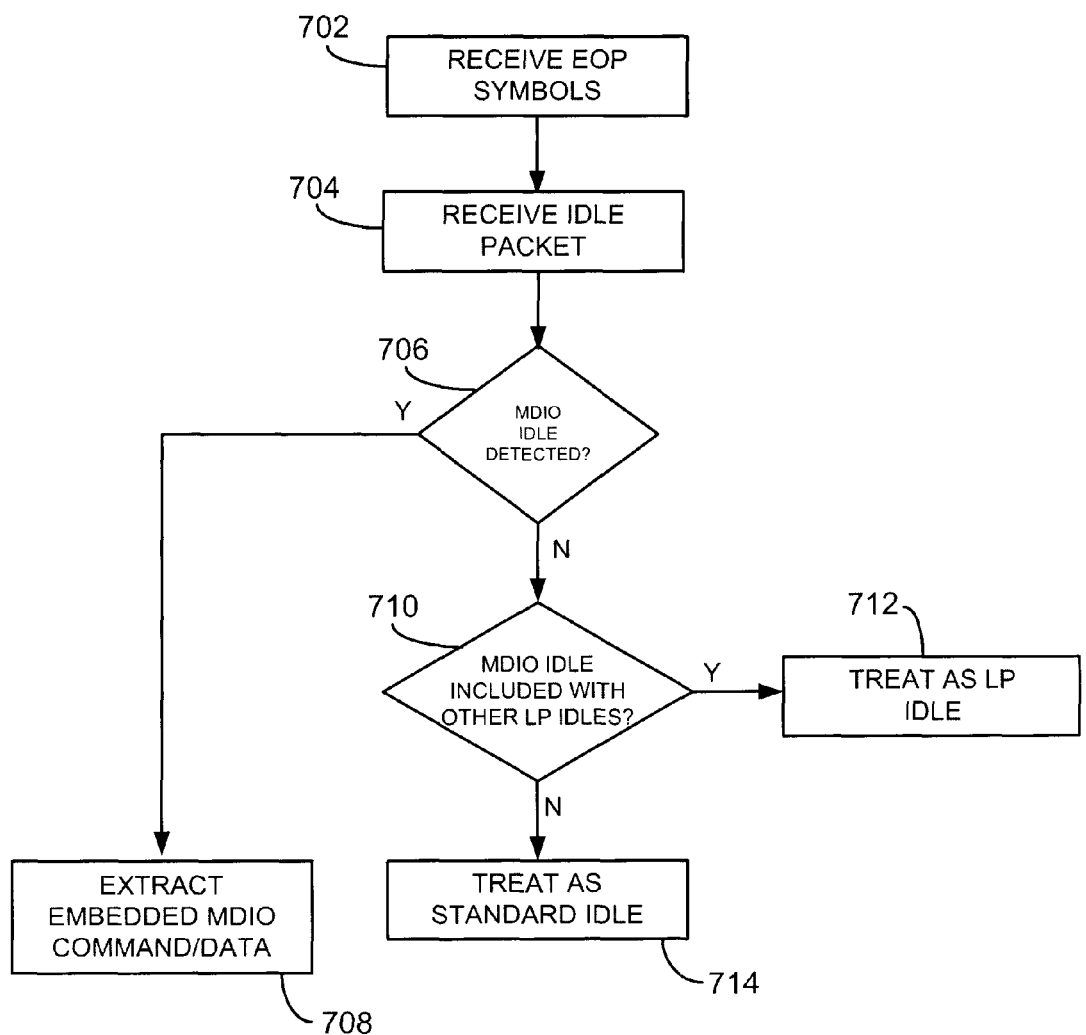

APPARATUS AND METHOD FOR ENCODING MDIO INTO SGMII TRANSMISSIONS

TECHNICAL FIELD

The disclosure herein relates generally to communications, for example to Ethernet communications.

BACKGROUND OF RELATED ART

High-speed Ethernet systems often employ multiple link ports that allow multiple transceiver link partners to exchange data traffic. Each link generally includes a physical interface circuit (PHY) that interfaces with a media access controller (MAC). For one IEEE Standard, more specifically IEEE 802.3 Clauses 22 and 45, the data link between each MAC and PHY is realized by a Serializer Deserializer (SERDES) link, such as a Serial Gigabit Media Independent Interface (SGMII). The SGMII employs two differential signal paths to convey transmit and receive data and optionally corresponding clock signals. Control and status updates regarding the PHY are typically managed through a separate serial link known as a Management Data Input/Output (MDIO) interface. MDIO signals are typically routed along a separate multi-drop bus from a Station Management entity (STA) to each PHY.

While the conventional IEEE 802.3 Standard works well for its intended applications, the use of a separate interface to handle MDIO operations generally involves extra pins on each PHY and is often limited in speed. This may be undesirable from circuit pin count, design, and performance perspectives.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of communication between an Ethernet Media Access Controller (MAC) and a physical interface (PHY) is disclosed. In one embodiment, the method includes establishing communication between the MAC and the PHY via a first serial link in accordance with a SERDES protocol. In a data transfer mode, data is transferred along the first serial link. Idle frames are transferred within an idle time gap along the link in an idle mode. The PHY is managed by encoding Management Data Input/Output (MDIO) information in one or more MDIO frames, and transferring the one or more MDIO frames within the idle time gap along the first serial link. By inserting the MDIO information into the idle time gap, the PHY may be managed without the need for a separate MDIO bus between the MAC and the PHY. As a result, respective MAC and PHY pin counts may be reduced, and the MDIO information may be communicated at higher rates.

For one embodiment, a Media Access Controller (MAC) is disclosed for interfacing with an integrated circuit physical layer (PHY) transceiver. The MAC includes packet generation logic to assemble data packets in a data transmission mode, and idle packets in an idle mode. Management data input/output interface (MDIO) logic encodes MDIO information into MDIO packets. Selection circuitry is responsive to a control signal to select between inserting the MDIO packets or the idle packets into one or more inter-packet gaps (IPG) for transfer across a serial link.

BRIEF DESCRIPTION OF THE DRAWINGS

The present embodiments are illustrated by way of example and are not intended to be limited by the figures of the accompanying drawings.

FIG. 6 illustrates further detail relating to one embodiment of the idle symbol sequence of FIG. 5.

FIG. 7 illustrates further steps relating to one embodiment in receiving and discriminating between different idle symbols, consistent with FIGS. 5 and 6.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
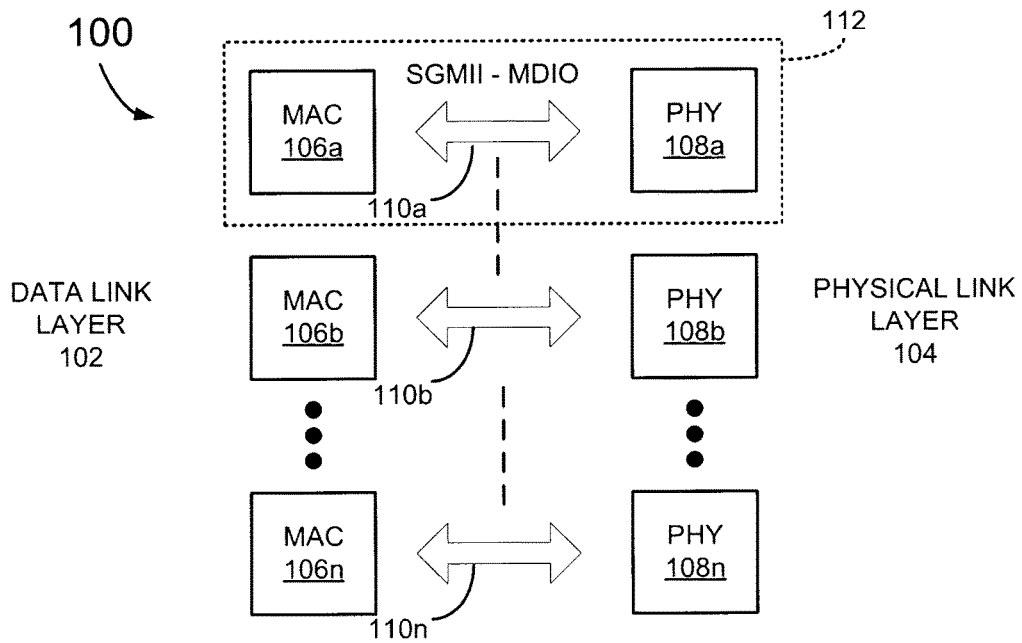
FIG. 1 illustrates a high-level block diagram of a multi-port MAC-PHY Ethernet interface.

More specifically, and referring generally now to FIG. 1, a portion of a multi-port Ethernet interface is shown, generally designated 100. The interface corresponds to the transition between a data link layer 102 and a physical link layer 104. The data link layer corresponds to LAYER 2 of the well-known 7-layer OSI Model of computer networking, while the physical link layer corresponds to LAYER 1 of the Model. Multiple Media Access Controllers (MACs) 106a-106n form a portion of the data link layer and interact with corresponding physical interface circuits (PHY) 108a-108n that correspond to the physical link layer.

Further referring to FIG. 1, the couplings between the MACs and the PHYs are carried out in a point-to-point relationship via links 110a-110n. In one embodiment, each of the links is a high-speed serial link, often referred to as a SERDES link, to transfer information in accordance with a Media Independent Interface (MII) protocol. For one embodiment, the Serial Gigabit Media Independent Interface (SGMII) protocol may be employed. The SGMII protocol and its variants (including Quad SGMII [QSGMII]) enable high-speed serial data transmission along very few link paths when compared to a traditional parallel interface. Each interconnected MAC and PHY, such as MAC 106a and PHY 108a, define a channel 112.

Figure 2:
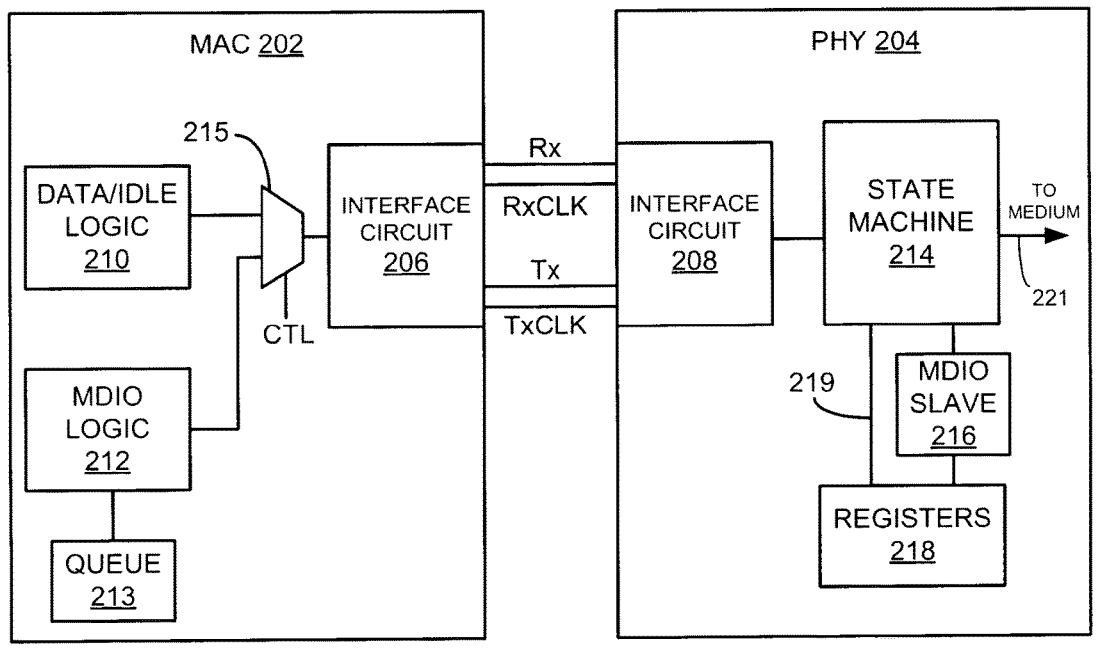
FIG. 2 illustrates a block diagram of one embodiment of one MAC-PHY interface architecture in FIG. 1.

FIG. 2 illustrates a more detailed view of one embodiment of the channel 112 of FIG. 1, with a MAC 202 and a corresponding PHY 204 corresponding to the MAC 106a and PHY 108a of FIG. 1. As noted above, each MAC 202 includes circuitry and associated functionality to carry out certain OSI data link operations, including providing addressing and channel access control functions that make it possible to communicate across a shared physical medium. The shared medium, for example, may be one or more twisted pair cables, at least one trace on a printed circuit board (PCB), or the like.

Further referring to FIG. 2, the MAC 202 includes a serial interface circuit 206. In one embodiment, the serial interface circuit is realized as a Media Independent Interface (MII) circuit, such as a Serial Gigabit Media Independent Interface (SGMII). In accordance with IEEE Standards, the SGMII interface circuit 206 employs circuitry to support respective differential transmit Tx and receive Rx signaling paths and associated clock paths TxCLK and RxCLK to transmit and receive data between the MAC 202 and PHY 204. The SGMII interface circuit 206 includes serialization circuitry (not shown) to serialize packets for transfer across the transmit signaling path Tx, and deserialization circuitry to deserialize packets received via the receive signaling path Rx. The SGMII interface circuit 206 interacts with a corresponding SGMII interface circuit 208 disposed on the PHY 204.

With continued reference to FIG. 2, packets transferred and received via the SGMII interface circuit 206 may be packaged and/or encoded/decoded by data/idle logic 210. For transmit operations, the data/idle logic 210 assembles, organizes and generates packets in accordance with an appropriate packet protocol. The packets may include both standard data packets and idle packets. Idle packets are generally transmitted during periods of no data transfer in order to maintain link operability between a given PHY and its counterpart link partner PHY (not shown). The idle packets may be transmitted during time slots often referred to as "idle gaps" in order to provide signal transitions that, for example, maintain convergence of link PHY filters and other adaptive components (not shown).

Further referring to FIG. 2, the MAC 202 includes MDIO logic 212 that generates MDIO packets that include MDIO information. The MDIO logic 212 generally manages the process of updating PHY register contents by generating and issuing periodic read and write commands. In one embodiment, the MDIO logic also generates other control signals to monitor the status of the PHY 204. The MDIO logic includes a queue 213 that temporarily stores MDIO commands during the transmission of data packets. A selector 215 includes a first input to receive the output of the data/idle logic 210, and a second input to receive the MDIO logic output. The selector 215 may respond to a control signal (CTL) to pass either data/idle packets from logic 210 or MDIO packets from logic 212 through to the interface circuit 206. As more fully explained below, the MDIO packets are inserted by the selector 215 into selected idle gaps. As will be described more fully below, the MDIO packets, or frames, are organized similar to conventional idle packets, and are treated as such by the PHY 204.

Further referring to FIG. 2, the one embodiment of PHY 204 includes a state machine 214 coupled to the PHY-side SGMII interface circuit 208. The state machine 214 interprets data and idle packets received from the MAC 202 and acts in accordance with pre-defined state machine criteria. The PHY 204 stores some of the pre-defined criteria in PHY registers 218, which may also include storage for other link-related status information. An MDIO slave 216 couples to the state machine 214 and detects when MDIO information is being passed during an idle gap. In some embodiments, the MDIO slave 216 may be bypassed, and the state machine 214 may interact directly with the PHY registers 218 via path 219 to access the MDIO command/data information. Standard data packets and/or idle packets may be forwarded by the PHY 204 along path 221 to a data transmission medium that links the PHY 204 to a partner PHY (not shown). The PHY 204 may be realized as an integrated circuit PHY transceiver that generally provides the network physical interface to the data transmission medium 220, such as a twisted pair cable or PCB trace, and interacts with the link partner PHY (not shown) on the other end of the connection.

Figure 3A:
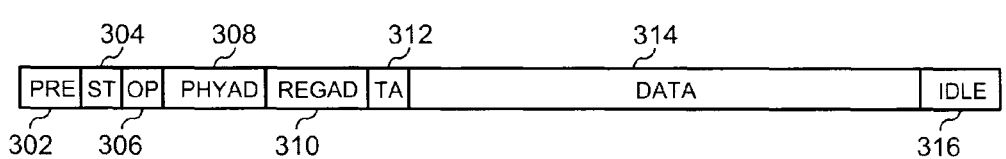
FIG. 3a shows a packet frame structure for an MDIO frame in accordance with IEEE Specification 802.3, Clause 22.

FIG. 3a illustrates one embodiment of a packet frame structure for an MDIO frame, generally designated 300, in accordance with IEEE Specification 802.3ae, Clause 22. The frame includes a preamble "PRE" field 302 followed by control bits including start ST bits 304 and access type OP bits 306 that specify a read or write command to access one or more of the PHY registers 218 (FIG. 2). A PHY address is provided in an address field PHYAD 308 while a register address is provided in another address field REGAD 310. Data is provided in a data field DATA 314, followed by an idle field IDLE 316. The "Clause 22" MDIO packet organization allows for accessing the addresses of up to thirty-two PHY devices via a 5-bit address.

Figure 3B:
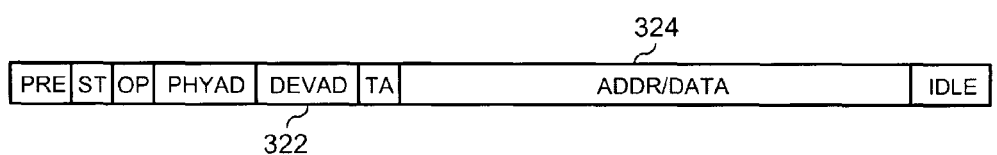
FIG. 3b shows a packet frame structure for an extended MDIO frame in accordance with IEEE Specification 802.3, Clause 45.

To access more registers, "Clause 45" of IEEE Specification 802.3ae allows for 16-bit register addressing, so that up to 65,536 registers may be accessed. FIG. 3B illustrates an example of an extended MDIO frame structure, generally designated 320, in accordance with Clause 45. Many of the fields for the Clause 45 frame are similar to the Clause 22 frame structure, but the register address field of Clause 22 is substituted for a device address field DEVAD 322, and a combined address/data field ADDR/DATA 324 is provided to specify an extended address of designated registers through plural frame transmissions.

Figure 4:
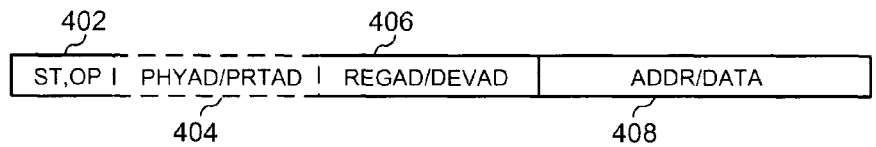
FIG. 4 illustrates one embodiment of an MDIO frame structure optimized for embedding within an SGMII idle gap.

As indicated above, in an effort to improve MDIO performance while avoiding the use of a separate MDIO interface to communicate MDIO information between each MAC and PHY, a modified MDIO frame structure or symbol may be employed, for which one embodiment is shown in FIG. 4. The MDIO frame structure allows out of band MDIO information to be embedded within in-band SGMII packet transmissions across the SGMII link between the MAC SGMII interface circuit 206 and the PHY SGMII interface 208. In one embodiment, the MDIO frame is transferred during idle periods of communication and includes a start/operation ST, OP field 402 that indicates the start of a particular read or write operation. Optionally, but not in the exemplary embodiment, the MDIO frame 400 may include a PHY or part address PHYAD/PRTAD field 404 includes bits that specify a particular PHY to access. However, the PHYAD/PRTAD field 404 may be omitted from the MDIO frame 400, e.g., due to the P2P behavior (since a dedicated channel will address a dedicated PHY). Register address information is included in a register address REGAD/DEVAD field 406. A data field ADDR/DATA 408 provides the data to be written or read from the addressed register.

Further referring to FIG. 4, the combined ST,OP data field 402 may define multiple types of MDIO frames that may be categorized as MII frames or MDIO Manageable Device (MMD) frames, depending on the data driving entity. In one embodiment, MII-driven operations involve those where data, such as write data, is driven by the MAC to the PHY. MMD-driven operations may be viewed as those where the data, such as read data, is driven by the PHY (referred to as MMD) to the MAC. The frame types may, for example, relate to whether the operation is a write operation. In one embodiment, if the operation is a read, then the link partner side may response with a read-back MDIO frame (different from the ST,OP field) with REGAD and data embedded. In one embodiment, the ST,OP field may be defined as a category of operation to advertise at least one specific capability, such as link status to replace (Q)SGMII auto-negotiation, flow control related capability of resolved results, and whether low-power operation is supported or enabled, etc.

Figure 5:
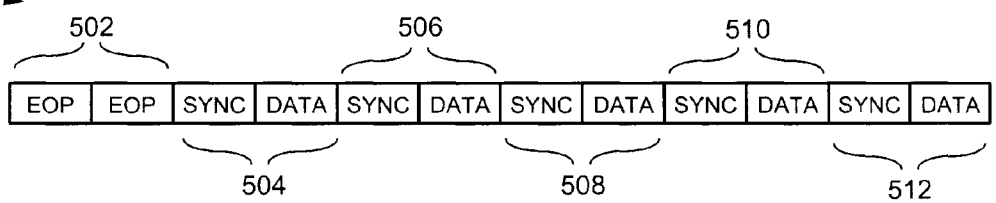
FIG. 5 illustrates a series of steps for one embodiment of a method for embedding out-of-band MDIO information into an SGMII idle sequence transmission.

FIG. 5 provides one embodiment of additional detail regarding an idle sequence of frames or symbols, generally designated 500, that may include embedded MDIO information. The idle sequence may be similar in organization and structure to conventional normal and low-power idle sequences that are standardized in accordance with IEEE 802.3. In one embodiment, an MDIO command and data transmission may be completed in a 12 symbol sequence, generally designated 500. The sequence begins with a pair of "end-of-packet" (EOP) symbols 502 that signal the start of the sequence, wherein in one embodiment the sequence begins immediately following the data sequence (as defined in the standard and similar to any other type of idle symbol sequence). In one embodiment, if the sequence does not start immediately after the data sequence, and there is an MDIO idle sequence before the MDIO command, the sequence will start from the MDIO idle sequence using fields of sequence 500, explained as follows. A next set of symbols, at 504, incorporates a frame boundary sync symbol SYNC and a data symbol DATA that is encoded to identify the idle sequence as an MDIO idle sequence. Three sets of command/data symbols and corresponding sync symbols are then transferred, at 506, 508 and 510, followed by an idle symbol set, at 512. The idle symbol set 512 addresses any running disparity in the symbol sequence, thus preparing the running disparity for any following data packet.

The MDIO idle symbol sequence described above works well with existing legacy PHY state machines that receive standardized idle sequences and low-power idle sequences. Because the symbol structure is similar to legacy idle configurations, the state machine operation can function normally while extracting the embedded MDIO information from the received MDIO idle sequence.

In one embodiment, operations between the MAC and PHY involve bidirectional data packet transfers, idle packet transfers and MDIO information transfers in accordance with steps generally set forth in FIG. 6. For data transfers from the MAC to the PHY, the data is assembled and packaged by the data/idle logic 210 and a data transfer request packet generated, at 602. The packaged data is then serialized by the SGMII interface circuit 206, at 604, and transferred to the PHY 204 along the transmit path Tx, at 606. At the PHY, the serialized data is received by the PHY SGMII interface and deserialized into parallel data more suitable for transfers from the PHY to a linked partner PHY (not shown). The state machine 214 detects the data packets and forwards the sequence to the link partner PHY. Data transfers from the PHY 204 to the MAC 202 are handled in a similar manner.

At the completion of one or more data transfers, a determination is made at 608 whether the PHY needs any management in the form of register updates, status read requests from the PHY registers 218, or the like. The determination involves whether any MDIO control information has been queued for transfer to the PHY. If no MDIO information has been queued, then standard idle packets are generated, at 610. When data is ready for transfer to or from the PHY, at 612, a new data transfer request is generated at 602, and the process steps described above iterate. If no data is ready for transfer, the idles are transferred in lieu of data until either MDIO information is detected in the queue, or data is ready for transfer.

If MDIO information is queued, at 608, then an MDIO idle packet is generated, at 614, to indicate transfer of MDIO information along the SGMII link from the MAC to the PHY. The actual MDIO information is then encoded and placed in one or more idle gaps, at 616, for transfer to the PHY, at 618. By encoding MDIO information into the SGMII link that interconnects the MAC 202 and PHY 204, the PHY may be managed by the MDIO control signals without the need for additional MDIO-specific pins on the PHY. Additionally, the features above may be implemented such that legacy PHYs will interpret the MDIO idles as standard idles, while PHYs that support IEEE 802.3az can interpret the idles as low-power idles, wherein if the MDIO idle packet is embedded in normal idles then the MDIO idle packet is treated as a normal idle by receiver side's SGMII PCS, and if the MDIO idle packet is embedded in low power idles then the MDIO idle packet is treated as a low power idle by the receiver side's SGMII PCS.

FIG. 7 provides one embodiment of additional detail regarding operation of the state machine 214 when receiving an idle sequence of symbols that may include embedded MDIO information. Generally, the end of a given data or idle packet includes one or more "end-of-packet" EOP bits to indicate the end of the packet or frame. The state machine detects the EOP bits, at 702, and may receive an idle packet, at 704. The state machine may then determine the type of idle being transmitted, at 706. The determinations may be made by, for example, identifying the specific encoding of the symbols within the idle packet. For example, symbol encodings that are consistent with so-called "comma symbols" may be used to identify a given idle packet as a standard idle, a low-power idle, or an MDIO idle. If an MDIO idle is detected, at 706, then the state machine acts to extract the embedded MDIO command/data information, at 708, and pass the information, for example, in the form of read or write operations to access the PHY registers 218. If MDIO information is not detected by the state machine 214, then a next-level determination is carried out as to whether the idle is a low-power idle, at 710. In one embodiment, as described above, if the MDIO idle packet is embedded in normal idles then the MDIO idle packet is treated as a normal idle by receiver side's SGMII PCS, and if the MDIO idle packet is embedded in low power idles then the MDIO idle packet is treated as a low power idle by the receiver side's SGMII PCS. If the MDIO idle is included with other LP idles, then the state machine treats the MDIO idle as a LP idle, at 712. If the MDIO idle is included with other standard idles, then the idle is treated as a standard idle, at 714.

Those skilled in the art will appreciate the benefits and advantages afforded by the embodiments described herein. By organizing and transferring MDIO information across a high-speed serial link that interconnects a given MAC and PHY, a dedicated MDIO bus may be omitted from the channel architecture. This may enable the respective MAC and PHY integrated circuits to have a reduced number of pins. Further, communicating the MDIO information over the serial link may provide performance improvements due to the high-speed nature of the serial link.

In the foregoing specification, the present embodiments have been described with reference to specific exemplary embodiments thereof. The specification and drawings are, accordingly, to be regarded in an illustrative sense rather than a restrictive sense.

What is claimed is:

1. A method of operation for a receiver circuit, the method comprising:
   receiving idle packet sequences;
   maintaining a link status based on the received idle packet sequences;
   detecting a Management Data Input/Output (MDIO) idle sequence from the received idle packet sequences;
   retrieving out-of-band MDIO information from the detected MDIO idle sequence;
   receiving an MDIO packet sequence in which no MDIO idle sequence is detected;
   treating the MDIO packet sequence as a standard idle packet sequence if the received idle packet sequences are standard idle packet sequences; and
   treating the MDIO packet sequence as a low power idle packet sequence if the received idle packet sequences are detected by the receiver circuit as low power idle packet sequences.

2. The method of claim 1 wherein the received idle packet sequences comprise low-power idle packet sequences.

3. The method of claim 1, wherein the detecting an MDIO idle sequence includes:
   decoding an encoded symbol in the MDIO idle sequence, the encoded symbol identifying the MDIO idle sequence as including the MDIO information.

4. A Physical Layer (PHY) integrated circuit device comprising:
   a serial link interface for coupling to a serial link;
   logic coupled to the serial link interface to, in a first mode, detect idle packets received from the serial link, and identify the idle packets as including Management Data Input/Output (MDIO) information from a Media Access Controller (MAC);
   wherein the logic is further configured to:
   receive an MDIO packet sequence in which no MDIO idle sequence is detected;
   treat the MDIO packet sequence as a standard idle packet sequence if the received idle packets are standard idle packet sequences; and
   treat the MDIO packet sequence as a low power idle packet sequence if the received idle packets are detected as low power idle packet sequences.

5. The Physical Layer (PHY) integrated circuit device of claim 4, further comprising:
   storage circuitry to store values associated with the PHY integrated circuit device;
   wherein the logic is responsive to the MDIO information to access the storage circuitry.

6. The Physical Layer (PHY) integrated circuit device of claim 5, wherein the storage circuitry comprises plural registers.

* * * * *